3,527,663
Patented Sept. 8, 1970

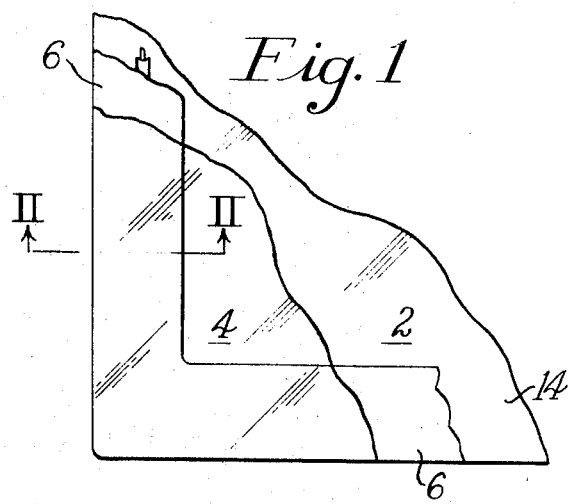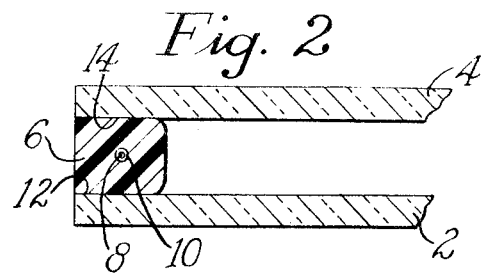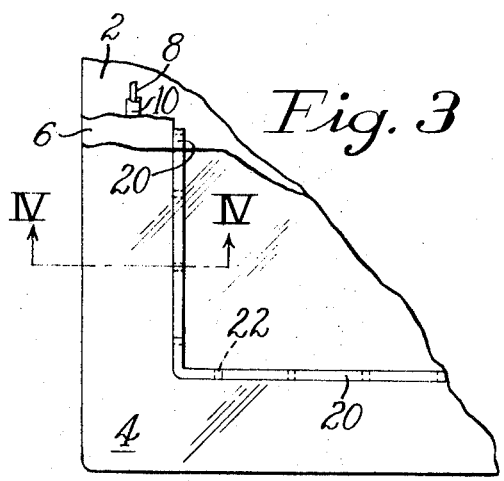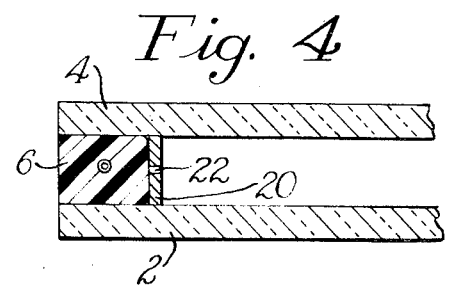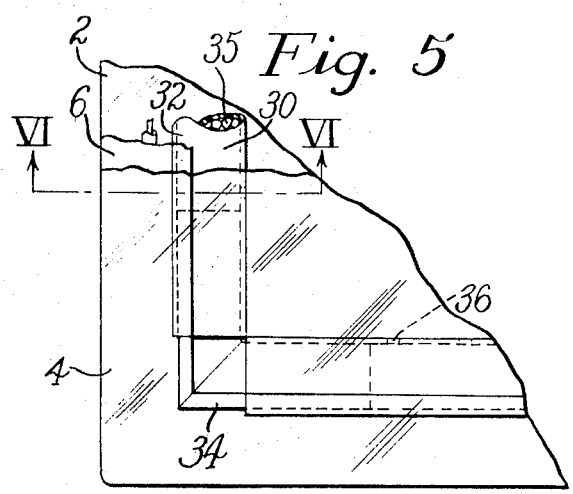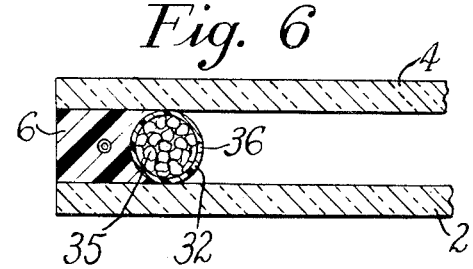
Inventors
Alan D. Rose
Ronald Woolman
By their Attorney

United States Patent Office

3,527,663
PRODUCTION OF DOUBLE GLAZING UNITS
Alan D. Rose, Slough, and Ronald Woolman, Leicester, England, assignors, by mesne assignments, to Bitumen Industries Limited, Slough, England, a corporation of Great Britain
Filed Oct. 9, 1967, Ser. No. 673,904
Claims priority, application Great Britain, Oct. 14, 1966, 45,954/66
Int. Cl. B29c *19/06;* B32b *1/04*
U.S. Cl. 161—45         16 Claims

ABSTRACT OF THE DISCLOSURE

Double glazing units are produced of two sheets of glass secured together in spaced, sealed relationship using a sealant strip of curable elastomer material having an electrical conductor embedded in the same.

---

The present invention is concerned with improvements in double glazing units.

There is at present a demand for double glazing units comprising two sheets of glass secured together in spaced, sealed relationship, with the seal or sealing being moisture proof and being effected through a sealant means extending between the two sheets and around the periphery thereof. A common method of manufacturing such double glazing units is to secure the two sheets of glass in the desired spaced relation and to flow in around or about the periphery of the sheets a curing sealant comprising polysulphide rubber and epoxy resin. When cured such a sealant provides an excellent, moisture proof bond between the two glass sheets. However, the use of that sealant suffers from some very serious shortcomings. The application of the sealant must be done with extreme care in order for the sealant to be expeditiously located, i.e. take up minimum space, and for the seal obtained to be moisture proof. As a result, the application of the sealant is a time consuming process. In addition it takes some 48 hours before the sealant has cured sufficiently to allow the then bonded unit to be handled at all freely. Thus considerable storage space is required for the manufacture of units by that process.

Other processes have also been used for the manufacture of double glazing units. They too are less than convenient in their practice if a moisture proof sealed unit is to be obtained. In one process a lead spacing unit is used which is bonded to both sheets of glass by an epoxy resin adhesive and application of heat. That method also suffers in that it is expensive and the sealant is somewhat rigid leaving the seal or bond liable to break down when subjected to mechanical or thermal stresses accompanying normal use.

It is an object of the present invention to provide an improved method, which is rapid and convenient in its practice for sealing and securing double glazing units.

It is another object of this invention to provide double glazed units exhibiting improved sealing and/or bonding between the glass sheets of the same.

These and other objects of the present invention are obtained in a double glazing unit comprising two sheets of glass secured together in spaced sealed relationship through a sealant member or strip of initially curable elastomer material which is then cured in situ. To effect this the sealant strip includes an electricity conductive member embedded in the same.

In producing a double glazing unit according to this invention, the sealing strip is positioned in interposed relationship between the peripheral margin and incidentally opposing faces of a pair of glass sheets and, electrical current is passed through the strip causing it to be cured in situ, and in doing so causing the curable elastomer material to be softened and then cured to a solidified elastomeric state, that is, a resilient, shape-retaining state.

The sealing strip uses a curable elastomer, that is, one that is deformable, non-elastic or showing minimum recovery, and tacky in nature when in the uncured state, but being resilient and shape retaining in the cured state. The elastomer may be polychloroprene or other curable elastomeric material. In practice, the strip may be of any convenient cross-sectional size and shape, for example, a strip having a circular cross section 5/16 in diameter works well. The electrically conductive member is embedded in the elastomeric material and runs longitudinally or along the axis of the strip. Further, a sheath of electrically insulating material may be provided in or around the conductive member. The strip may be located or positioned on a first sheet of glass, and then end portions of the strip overlapped and trimmed to provide uniform thickness at the overlap and end portions of the conductor may be provided in protruding position. Spacing members may be positioned on the first sheet, and when used are preferably located outward from the strip so that they may be removed after completion of the double glazing unit. Thereafter the second sheet of glass may be positioned on or against the positioned strip, the sheets clamped across with moderate pressure and an electrical charge furnished to the conductor embedded in the strip. As a result of the charge the strip first softens under the heat developed in the conductor and the strip material flattens to the extent determined by the spacings members. After a short period the strip softens sufficiently to enable smoothing of the edge of the strip to improve the appearance of the unit and to increase the area of contact between the sheets of glass and the strip. With the charge continuing the curing advances and after about seven minutes the material of the strip is cured to a strong shape retaining condition, that is, the unit may then be freely handled, and the electric current is then switched off.

As indicated, the resultant glazed unit is securely bonded and may be handled immediately. The seal obtained is impervious to moisture, and has a desirable slight resilience.

Double glazing units of different sizes may be conveniently manufacteured with strips of different configurations; for example if a particularly widely spaced unit is required it may be convenient to use a sealing strip having a rectangular cross section, the larger dimension of the rectangle being slightly more than the desired spacing of the unit, the smaller about 5/16″, a generally acceptable thickness for the seal. Then too, on occasion in order to obtain a rapid and uniform cure of the seal, it may be desirable to incorporate more than one conductor in the strip.

The accompanying drawings are provided to further illustrate the invention in which:

FIG. 1 is a plan view, broken away, of a corner section of a double glazing unit produced in accordance with the present invention;

FIG. 2 is a section taken along the line II—II of FIG. 1;

FIG. 3 is a plan view, broken away, of a corner section of another double glazing unit produced in accordance with the present invention;

FIG. 4 is a section taken along the line IV—IV of FIG. 3;

FIG. 5 is a plan view, broken away, of a corner section of still another double glazing unit produced in accordance with the present invention; and FIG. 6 is a section taken along the line VI—VI of FIG. 5.

Reference is now made to the drawings. FIGS. 1 and 2 show one embodiment of a double glazing unit comprising a first sheet of glass 2 and a second sheet of glass 4, both of the same size, and positioned therebetween or in interposed relationship, a sealing strip 6. The sealing strip 6 includes a conductor wire 8 embedded in a curable elastomer compound 12. The wire 8 is of a 90% copper nickel alloy having a diameter of 0.024 inch and a resistance of 0.440 ohm per yard. The wire 8 is provided with an insulating sheath 10 of resin bonded glass fiber.

The curable elastomeric compound 12 is of the following formula:

| Component: | Parts by weight |
|---|---|
| Polychloroprene rubber | 70 |
| Oil extended styrene-butadiene rubber | 30 |
| Ball clay | 41 |
| Furnace black | 20.5 |
| Caloxal C. 31 | 3.7 |
| Cashew nut shell phenolic resin | 5.0 |
| Benzoic acid | 0.5 |
| Lubricated hexamine | 2.5 |
| Asbestos | 3.7 |
| Light magnesium oxide | 1.6 |
| Antioxidant | 1.0 |
| Tetramethyl thiuram disulphide | 0.6 |
| Diorthotolyl guanidine | 0.6 |
| Sulphur D | 1.0 |

Prior to positioning the sealing strip 6 onto the sheets 2 and 4, peripheral marginal portions 12 and 14 of the sheets 2 and 4 are coated with a mercapto silane primer dissolved in volatile organic solvent.

The strip 6 may be cut to the appropriate length and laid onto the peripheral marginal portion 12 of the sheet 2. Then in a manner not shown in the drawings, end portions of strip 6 are trimmed to provide for uniform thickness at an overlap portion of the strip 6 and the wire 8 caused to protrude from the compound 12 of the strip 6. The glass sheet 4 is then laid on or against the sealing strip 6, which latter engages the primed marginal portion 14 of the former. Spacing members, (not shown) may be positioned between the sheets to determine the eventual spacing between the sheets 2 and 4 of the finished double glazing unit. When used, the spacing members are preferably positioned at the corners of the sheets 2 and 4 and may also be stationed along the sides of the sheets 2 and 4 if the size of the sheets makes it desirable. The sheets 2 and 4 are then clamped together under moderate pressure and an electrical potential of approximately 2 volts per foot of the strip 6 is applied to the end portions of the wire 8. The strip 6 softens and is flattened between the sheets 2 and 4, providing a broad area of contact between the strip 6 and the sheets 2 and 4. After 1½ to 2 minutes of electrical heating, the curable elastomer compound 12 of strip 6 is sufficiently soft for those portions of the strip 6 which may then protrude beyond the sheets 2 and 4, to be smoothed in, and so provide for a unit of neat appearance. After the electrical voltage has been applied about 7 minutes, the elastomeric material is cured to a strong shape retaining condition and the current is switched off and the spacing members removed.

The resultant unit is securely bonded together, and may be handled immediately and with normal handling there is no risk of damaging the bond. The seal obtained is shown on test to be impervious to moisture and has a slight resilience which reduces the risk of breakage to the unit under thermal or mechanical stress expected with normal usage.

The second embodiment of the double glazing unit is shown in FIGS. 3 and 4 and is similar to that previously described save that it is provided with a spacing member 20 which extends around the unit just inside the sealing strip 6. The spacing member 20 comprises a strip of aluminum about 1/32" thick and is provided with a series of small holes 22. If desired desiccant, not shown, may be positioned between the strip 6 and the spacing member 20. The manufacture of this second embodiment unit is carried out in the same manner as that of the previous embodiment, save that the member 20 serves to maintain the spacing of the sheets of glass, and no further spacing members (as suggested in manufacture of the first illustrative unit) are used. When tested this embodiment of the double glazing unit exhibits the same high performance as that of the previous embodiment.

FIGS. 5 and 6 show a third embodiment of the double glazing unit of this invention. It is closely similar to that of the second embodiment save that it includes a spacing frame 30 of slightly more complex construction than the spacing member 20 of the previous embodiment. Frame 30 comprises four cylindrical tubes 32, each of appropriate length, which tubes are hollow and secured together by corner pieces 34 which are circular in cross section and L shaped. The corner pieces 34 are made of polyethylene and are pushed into end portions of the tubes 32 to provide the rectangular frame 30. The tubes 32 are hollow and may contain desiccant 35 if required, and a series of apertures 36 in each tube provides access to the desiccant. Performance of this embodiment of the double glazing unit, as to moisture imperviousness and strength is excellent.

While the units described above are made using a sealing strip of an elastomeric material comprising a chloroprene polymer, numerous other compositions may be used instead. Such compositions include those which are tacky and deformable in the uncured state and which cure to a resilient state on heating to provide a waterproof seal between the sheets of glass when cured. Examples of such compositions are compositions comprising butyl rubber or ethylene propylene terpolymer. The compositions may also include other rubbery polymers or copolymers such as styrene-butadiene rubbery copolymer, together with extender, filler, antioxidant and coloring materials. In addition to the properties already mentioned, preferred compositions also have a low water vapor transmission rate, and good aging properties in respect of ultra-violet light.

It will thus be seen that the objects set forth above, among those made apparent from the preceding description are efficiently attained, and since certain changes may be made in the above double glazing units, and the method by which they are produced without departing from the scope of the invention, it is intended that all matter contained in the above description and in the accompanying drawings shall be interpreted as illustrative and not in a limiting sense.

Having thus described our invention what we claim as new and desire to secure by Letters Patent of the United States is:

1. An improved method for producing double glazed units which comprises positioning a sealant strip of tacky, deformable curable elastomeric material including an electrically conductive member in interposed relationship between peripheral margins of a pair of glass sheets, applying pressure across the sheets and directing a current of electricity through the conductor to heat the elastomeric material to a softened state and then to a resilient, shape retaining cured state.

2. An improved method according to claim 1 wherein spacing members are positioned between the glass sheets.

3. An improved method according to claim 1 wherein a desiccant is included between the glass sheets.

4. An improved method according to claim 1 wherein the electrically conductive member is provided with an electrically insulating sheath.

5. An improved method according to claim 1 wherein the peripheral margins of the glass sheets are treated with a primer.

6. An improved method according to claim 2 wherein the spacing members constitute metal strips having holes therethrough, the said metal strips being positioned inwardly of the sealant strip.

7. An improved method according to claim 2 wherein the spacing members constitute a frame of hollow tubes secured at the corners thereof and positioned inwardly of said sealant strip, the said tubes being provided with holes in the sides thereof.

8. An improved method according to claim 12 wherein a desiccant is included within the hollow tubes.

9. An improved double glazed unit according to claim 8 wherein spacing members are positioned between the glass sheets.

10. An improved double glazed unit according to claim 14 wherein the spacing members constitute metal strips having holes therethrough, the said metal strips being positioned inwardly of the sealant strip.

11. An improved double glazed unit according to claim 14 wherein the spacing members constitute a frame of hollow tubes secured at the corners thereof and positioned inwardly of said sealant strip, the said tubes being provided with holes in the sides thereof.

12. An improved double glazing unit according to claim 15 wherein a desiccant is positioned between the metal strips and sealant strip.

13. An improved double glazing unit according to claim 16 wherein a desiccant is included within the hollow tubes.

14. An improved double glazed unit including a pair of glass sheets with a sealant strip of cured, deformed elastomeric rubber material interposed between peripheral margins of the said sheets, the sealant strip including an electrically conductive member embedded in the same, the strip of elastomeric material being cured in situ to a resilient, shape retaining, deformed state by directing a current of electricity through the electrical conductor member.

15. An improved double glazed unit according to claim 8 wherein the sealant strip includes an electrically insulating sheath for the electrically conductive member.

16. An improved double glazed unit according to claim 8 wherein the elastomeric material is a polychloroprene rubber.

References Cited

UNITED STATES PATENTS

| | | | |
|---|---|---|---|
| 2,077,305 | 4/1937 | Batchell | 161—45 |
| 2,966,435 | 12/1960 | Kassinger | 161—45 |
| 3,047,703 | 7/1962 | Aske | 156—275 |
| 3,183,560 | 5/1965 | Brichard | 161—45 |
| 3,263,268 | 8/1966 | Flaherty | 156—275 |
| 3,378,672 | 4/1968 | Blumenkranz. | |

DOUGLAS J. DRUMMOND, Primary Examiner

U.S. Cl. X.R.

156—275

PO-1050
(5/69)

UNITED STATES PATENT OFFICE
CERTIFICATE OF CORRECTION

Patent No. 3,527,663      Dated September 8, 1970

Inventor(s) Alan D. Rose and Ronald Woolman

It is certified that error appears in the above-identified patent and that said Letters Patent are hereby corrected as shown below:

```
Column 5, claim  8, line 1, change "12" to --7--:
Column 5, claim  9, line 2, change  "8" to --14--;
Column 5, claim 10, line 2, change "14" to --9--;
Column 5, claim 11, line 2, change "14" to --9--;
Column 5, claim 12, line 2, change "15" to --10--;
Column 5, claim 13, line 2, change "16" to --11--;
Column 6, claim 15, line 2, change  "8" to --14--;
Column 6, claim 16, line 2, change  "8" to --14--.
```

SIGNED AND SEALED
DEC 8 1970

(SEAL)
Attest:

Edward M. Fletcher, Jr.
Attesting Officer

WILLIAM E. SCHUYLER, JR.
Commissioner of Patents